United States Patent [19]
Tezuka

[11] Patent Number: 4,594,617
[45] Date of Patent: Jun. 10, 1986

[54] METHOD AND APPARATUS FOR CLEANING A RECORDING AND/OR REPRODUCING HEAD

[75] Inventor: Nobuo Tezuka, Kanagawa, Japan

[73] Assignee: Canon Kabushiki Kaisha, Tokyo, Japan

[21] Appl. No.: 522,045

[22] Filed: Aug. 10, 1983

[30] Foreign Application Priority Data

Aug. 11, 1982 [JP] Japan ............................. 57-139388
Jan. 27, 1983 [JP] Japan ............................. 58-11688
Feb. 2, 1983 [JP] Japan ............................. 58-15823
Feb. 3, 1983 [JP] Japan ............................. 58-16798

[51] Int. Cl.$^4$ ............................................. G11B 5/41
[52] U.S. Cl. ....................................... 360/73; 360/128
[58] Field of Search ............... 360/73, 74.1, 97, 99, 360/128, 137

[56] References Cited

U.S. PATENT DOCUMENTS 4,291,353 9/1981 Fletcher et al. ................. 360/128
4,384,311 5/1983 McNeil ............................ 360/128
4,510,541 4/1985 Sasamoto ......................... 360/97

FOREIGN PATENT DOCUMENTS 2365095 7/1975 Fed. Rep. of Germany ...... 360/128
47-28934 7/1972 Japan ................................ 360/128
56-58127 5/1981 Japan ................................ 360/128
56-134315 10/1981 Japan ............................. 360/128
57-58223 4/1982 Japan ................................ 360/128

OTHER PUBLICATIONS

IBM Technical Disclosure Bulletin, vol. 26, No. 2, Jul. 1983, p. 695, Magnetic Head On-Line Cleaning, Ertingshausen et al.

Primary Examiner—George G. Stellar
Attorney, Agent, or Firm—Toren, McGeady, Stanger, Goldberg & Kiel

[57] ABSTRACT

A recording and/or reproducing head which is adapted for recording signals on a recording medium and/or reproducing the signals from the medium when the head and the medium are relatively moved at a first relative speed is cleaned with a head cleaning member when the head and the cleaning member are relatively moved at a second relative speed lower than said first relative speed.

27 Claims, 13 Drawing Figures

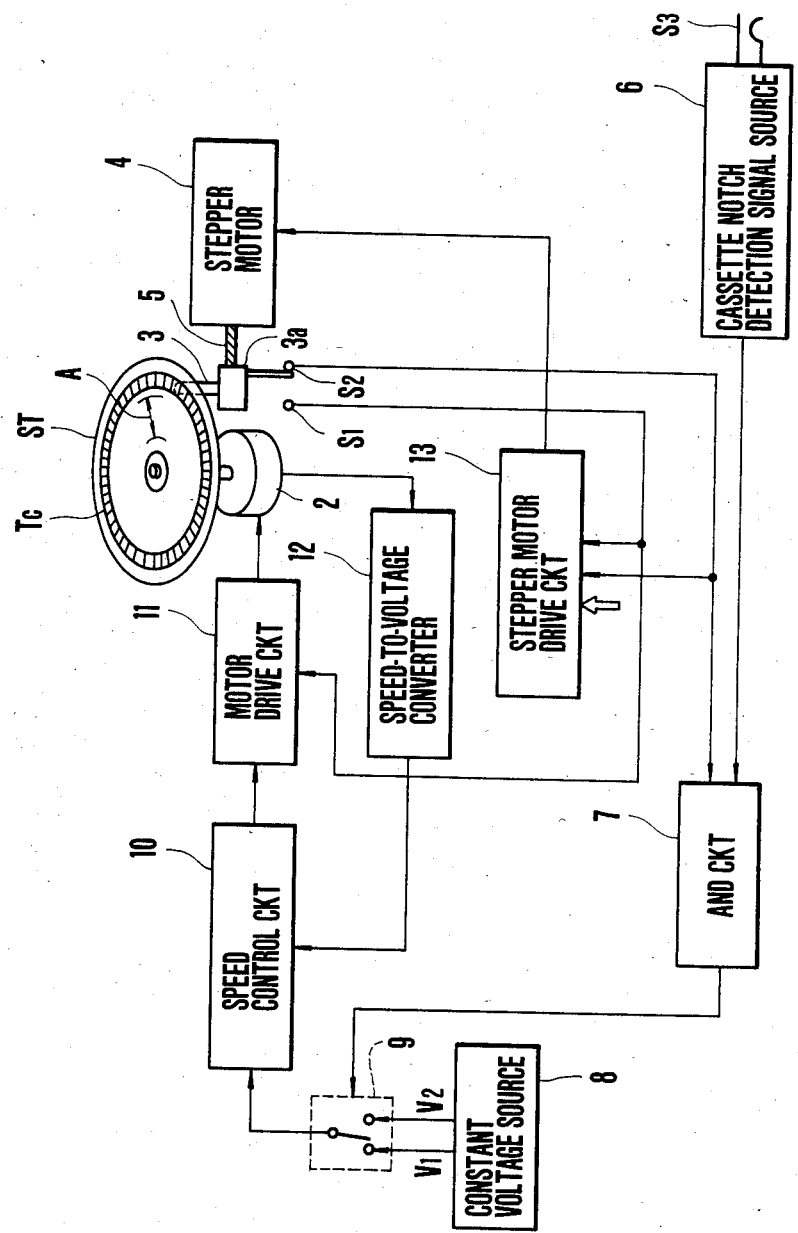
F I G. 5

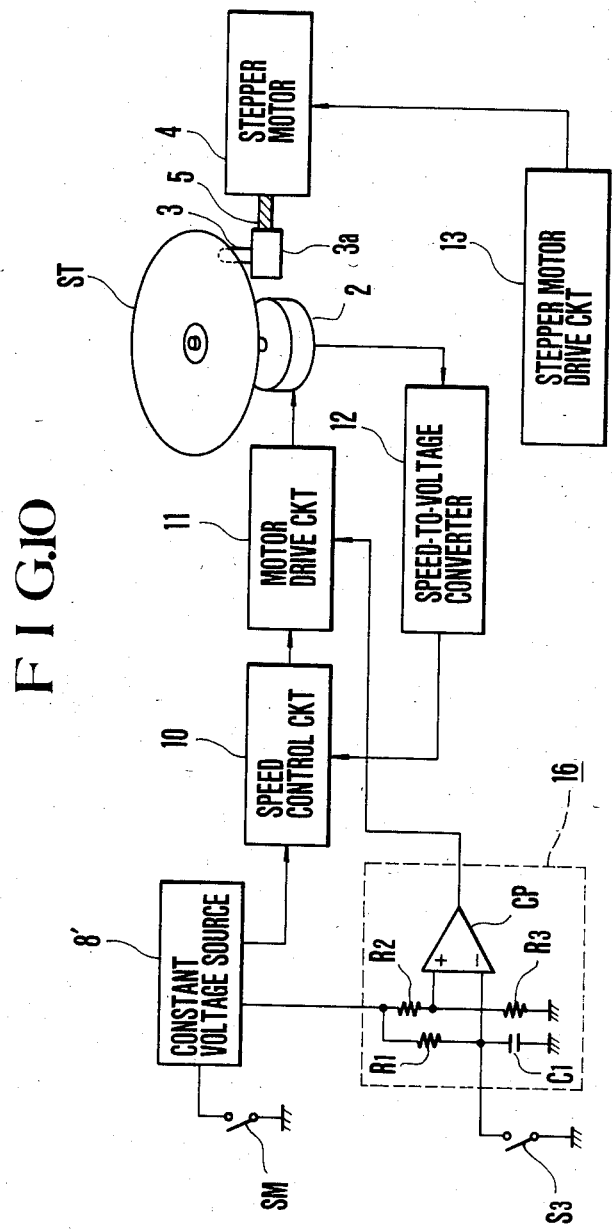
F I G. 10

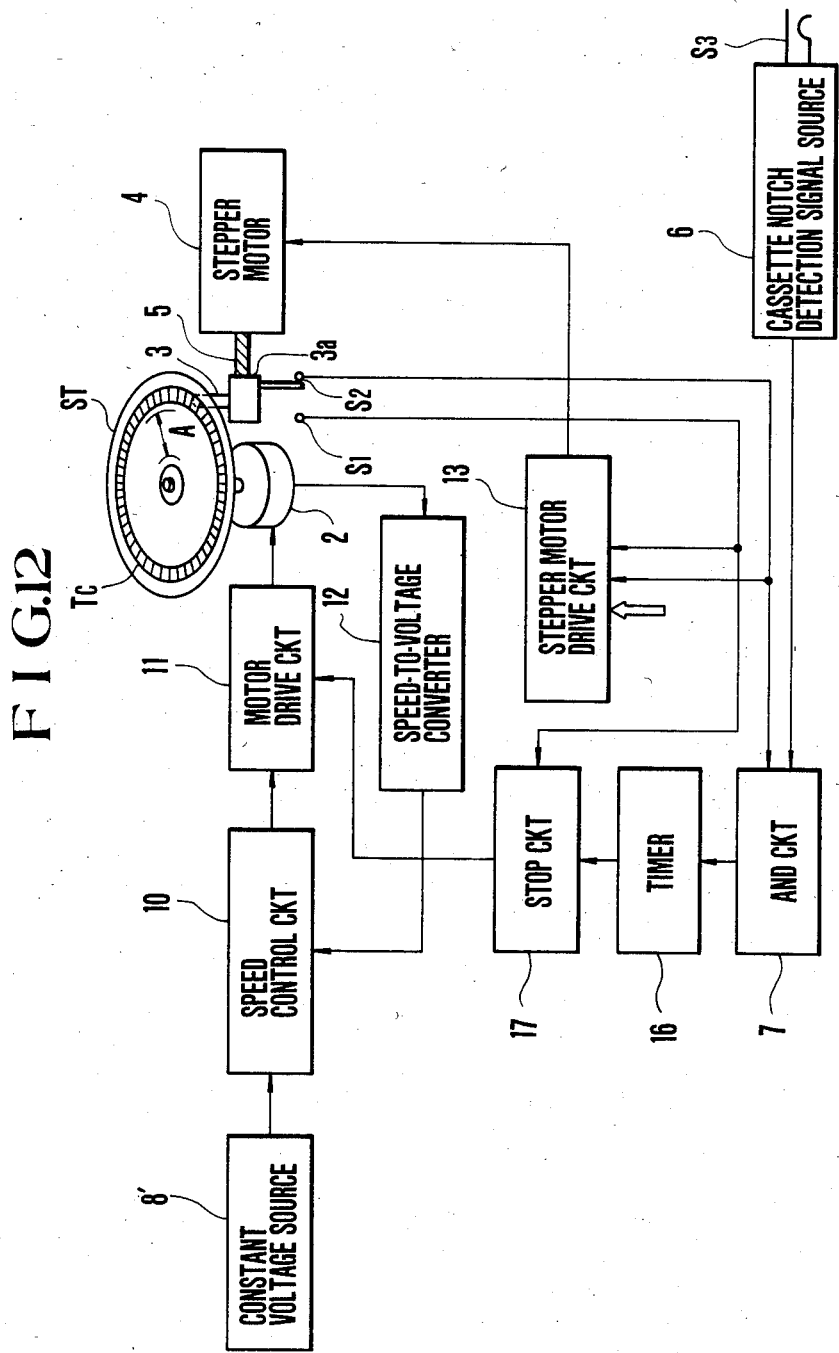

METHOD AND APPARATUS FOR CLEANING A RECORDING AND/OR REPRODUCING HEAD

BACKGROUND OF THE INVENTION

1. Field of the Invention

This invention relates to a method and an apparatus for cleaning a recording and/or reproducing head.

2. Description of the Prior Art

In an apparatus for recording and/or reproducing information on and from a recording medium, such as a magnetic sheet, a magnetic disc, a magnetic drum, a magnetic tape, etc., the recording or reproducing characteristics degrade when the recording medium confronting surface of the recording and/or reproducing head (hereinafter called the head ) of the apparatus is soiled with dust or magnetic debris or the like. To remove the soil, therefore, a method of cleaning the surface of the head, for example, by means of a solvent has been adopted. However, in the case of apparatus adapted for recording and/or reproducing video signals, the head is arranged with extreme precision. Therefore, application of the above-stated cleaning method is apt to damage the head. Besides, video tape players and rotary magnetic sheet, disc or drum players often have the head located in a position not readily accessible. Therefore, the above-stated cleaning method is not easily applicable to such players.

In view of such difficulty, there has been adopted another head cleaning method in which the head is cleaned by loading the recording and/or reproducing apparatus with a so-called cleaning tape or a cleaning sheet, disc or drum and by allowing the cleaning tape, sheet, disc or drum to travel or rotate in the same manner as in an ordinary recording or reproducing operation. However, apparatus adapted for recording and/or reproducing video signals has a very high relative moving speed between the recording medium and the head. The high relative movement speed produces an air film between the recording medium and the head. Therefore, in cleaning the head, if the head and the cleaning material are allowed to move relative to each other at the same high speed, the air film would come to hinder the head surface from being adequately cleaned.

Further, in the case of a recording and/or reproducing apparatus using a rotary recording medium, the rotating direction of the recording medium is fixed. Accordingly, in this instance, dust or debris or the like comes to accumulate on the head always in a fixed direction. For example, the dust or debris accumulates in an area close to an area of the recording medium confronting surface of the head situated upstream of the rotation of the recording medium. The soil due to the accumulated dust or debris eventually trails on the head surface downstream of the recording medium rotation. In such a case, the soiled head cannot be always sufficiently cleaned by the cleaning method of allowing a cleaning disc, sheet or drum to rotate in the same direction as in a recording or reproducing operation.

Further, the lapping material which is used in general for cleaning the head has a much greater frictional effect on the head than ordinary recording media. Use of a lapping material for cleaning over a long period of time, therefore, tends to wear away the head. When a lapping material is to be used for cleaning, the relative rotation of the recording or reproducing head and the lapping material must be allowed to continue for a minimal limited period of time.

SUMMARY OF THE INVENTION

It is therefore an object of the present invention to provide an improved method and an improved apparatus for cleaning a recording and/or reproducing head which eliminate the above-stated shortcomings of the prior art methods.

Another object of the invention is to provide a method and an apparatus for cleaning a recording and/or reproducing head wherein the head is cleaned efficiently and adequately by allowing a cleaning member and the head to move relative to each other with the two set face to face.

A further object of the invention is to provide a head cleaning method and an apparatus to carry out the method, whereby a recording and/or reproducing head can be effectively and adequately cleaned by opposing a cleaning member to the head and by arranging them to effect relative motion without producing an impedimental air film between the head and the cleaning member.

In a preferred embodiment of the invention under this object, a recording and/or reproducing head is opposed to a cleaning member and is cleaned by allowing them to move relative to each other. The speed of the relative movement which takes place between the cleaning member and the head during the head cleaning operation is arranged to be slower than the speed of a relative movement which takes place between the head and a recording medium during an information recording or reproducing operation.

Further, according to a preferred embodiment of the invention, a recording and/or reproducing apparatus is arranged to record or reproduce information by allowing the head and a recording medium to effect relative movement therebetween with the two set face to face and detecting means is provided for detecting that the apparatus is loaded with a cleaning member. Means are provided for making the speed of a relative movement between the head and the cleaning member slower than the speed of the relative movement between the head and the recording medium at the time of recording or reproducing in response to the operation of the detecting means.

Another object of the invention is to provide an arrangement wherein cleaning a recording and/or reproducing head with a cleaning member by allowing the cleaning member to rotate while being opposed to the head, enhances the cleaning efficiency by causing the cleaning member to rotate in a direction reverse to the direction in which a recording medium rotates during a recording or reproducing operation.

To attain this object, according to a preferred embodiment of the invention, a recording and/or reproducing apparatus having a recording and/or reproducing head opposed to a cleaning member for cleaning the head by rotating the cleaning member is provided with a motor for causing the cleaning member to rotate, the motor being arranged to be capable of rotating both in the forward and reverse directions and with control means for causing the motor to rotate in a first direction for recording or reproducing information and to rotate in a second direction at the time of cleaning the head, the second direction being opposite to the first.

A still further object of the invention is to provide an arrangement which, while cleaning a recording and/or reproducing head with a cleaning member which rotates in opposed relationship to the head, effectively prevents wear of the head and ensures efficient cleaning by limiting the period of time of rotation of the cleaning member to a minimum required period.

To attain that object, according to a preferred embodiment of the invention, a recording and/or reproducing apparatus, wherein the recording and/or reproducing head is opposed to a cleaning member for cleaning the head by allowing the cleaning member to rotate, is provided with a timer device which is arranged to stop the cleaning member from rotating after the lapse of a prescribed length of time at the time of head cleaning.

These and further objects and features of the invention will become apparent from the following detailed description of preferred embodiments thereof taken in conjunction with the accompanying drawings.

BRIEF DESCRIPTION OF THE DRAWINGS

FIG. 5 is a block diagram showing a fourth embodiment example of the invention.

FIG. 10 is a block diagram showing the eighth embodiment example of the invention.

FIG. 12 is a block diagram showing the tenth embodiment example of the invention.

DETAILED DESCRIPTION OF THE PREFERRED EMBODIMENT

Embodiment Example 1:

A first embodiment of the invention (hereinafter called Example 1) which will be described below uses either a rotary magnetic sheet or a magnetic tape as the recording medium. In the case of the rotary magnetic sheet, a lapping material which is employed as the cleaning member is stuck, for example, to a part of the recording surface of the rotary magnetic sheet. Hereinafter this part will be called a cleaning track. In this instance, the recording tracks of the sheet may be arranged either concentrically or spirally. In cleaning the head, the cleaning member on the cleaning track is opposed to the head and a relative movement is allowed to take place between the head and the cleaning member. Where the magnetic tape is used as recording medium, the cleaning material or member is applied either to the fore end or rear end portion of the tape.

The relative movement of the head and the recording medium is as follows: Generally, the thickness of an air film which appears between the head and the recording medium during their relative travel is determined by the shape of the head, the viscosity of air, the rigidity of the sheet and the speed of the relative movement between the head and the sheet. The thickness of the air film decreases as the relative speed of movement decreases. Assuming that the thickness of the air film is h and the relative speed V, there obtains a relation $h = c \cdot V^n$, wherein $n > 1$ and c represents a constant.

In Example 1, the surface of the head is cleaned with the above-stated relative movement speed lowered to a suitable value in such a manner as to allow the head and the recording medium to move relative to each other while being nearly in contact with each other. This relative movement speed effects a relative movement speed between the head and the cleaning member attached to the recording medium. In determining the extent to which the relative movement speed should be lowered, therefore, it is a peripheral velocity that must be considered in the case of the rotary magnetic sheet. This involves the angular velocity of rotation and diameter of the magnetic sheet and the various factors mentioned in the foregoing. The relative movement speed, therefore, varies with the design of the recording and/or reproducing apparatus and is not limited to any specific critical value. However, according to the results of experiments conducted by the present inventor, a gap which exists between the head and a recording medium on the move during recording or reproduction, i.e. the above-stated thickness of air film, is about 250 nm. Accordingly, it is preferable to reduce the gap at least by half in cleaning the head with the cleaning material. The cleaning material of course should not be brought too close to the head to prevent the head surface from being damaged by the cleaning material.

Figure 1:
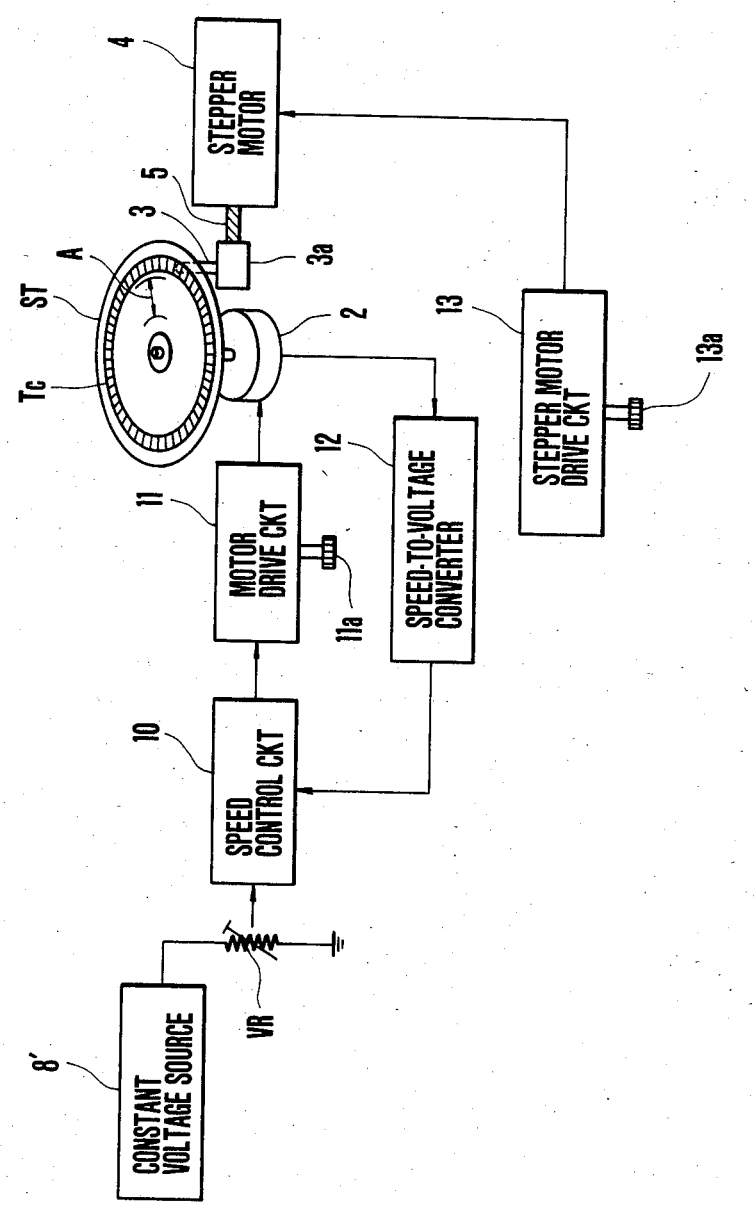
FIG. 1 is a block diagram showing a first embodiment example of the invention.

Referring to FIG. 1 the magnetic sheet ST has a recording area A. A cleaning track Tc is formed by sticking a cleaning material along the outer circumference of the recording area A. The magnetic sheet ST is arranged to be rotated by a motor 2. The head 3 (magnetic head) is secured to a head carrier 3a. A stepper motor 4 is arranged to cause the head 3 to shift its position from one track to another. The rotation of the stepper motor 4 is converted into a linear motion by a mechanism 5, which is a screwed arrangement in this case. The screw 5 is carried by the stepper motor and is in screw engagement with the head carrier 3a. The head carrier 3a is also fittingly engaged with a guide rod which is not shown but is secured to the recording and/or reproducing apparatus. The motor 2 is provided with a constant voltage source 8' which supplies a voltage to the motor 2 via a variable resistor VR, a speed control circuit 10 and a motor drive circuit 11. The motor 2 is thus arranged to have its rotation shiftable between a high speed and a low speed. The variable resistor VR may be replaced with a change-over switch or a coil tap switch-over arrangement. A speed-to-voltage converter 12 is arranged to convert the rotation velocity of the motor 2 into a voltage. A servo system is formed jointly by the speed control circuit 10, the motor drive circuit 11 and the converter 12. The embodiment example further includes a stepper motor drive circuit 13 and operation parts 11a and 13a which are provided for controlling the operations of the motor drive circuit 11 and the stepper motor drive circuit 13 respectively.

The cleaning track Tc on the magnetic sheet ST is formed on the head-confronting side of the sheet ST, that is, it is formed on the same side of the sheet on which a magnetic layer is formed.

In Example 1 which is arranged as shown in FIG. 1, the head 3 is cleaned as follows: The stepper motor drive circuit 13 is operated via the operation part 13a to cause the stepper motor 4, for example, to rotate reversely in such a way as to adjust the position of the head 3 to the cleaning track Tc. With the head shifted to the cleaning track, the motor 2 is operated to cause the sheet ST to rotate. In this instance, the variable resistor VR which is connected to the constant voltage source 8' is adjusted to obtain a low voltage for low speed rotation of the motor 2 or, alternatively, the motor drive circuit 11 is operated via the operation part 11a in such a way as to cause the motor 2 to rotate at the low speed. The rotation speed of the motor in that instance is lowered from the speed for a recording or reproducing operation to a value at which the above-stated air film which is produced between the head 3 and the sheet ST during ordinary information recording or reproduction is reduced by half or substantially negated. With the sheet rotated at the reduced speed, the head 3 is cleaned with the cleaning material provided on the cleaning track of the sheet ST.

After the cleaning is performed for a necessary period of time, the head 3 is brought into a desired recording track position within the recording area A on the sheet ST by operating the stepper motor drive circuit 13 with the operation part 13a to cause the stepper motor 4 to rotate, for example, in the normal or forward direction. Meanwhile, the variable resistor VR or the operation part 11a of the motor drive circuit 11 is brought back to its original position to allow the motor 2 to rotate at the higher speed required for information recording or reproduction. This brings the apparatus back to its operation mode for information recording or reproduction.

In the example described, the recording medium which is provided with the recording tracks and the cleaning material is used for cleaning the head. However, it is possible to use a specialized cleaning sheet or tape which is prepared specially and solely for the cleaning purpose in place of the recording medium. In that case, the cleaning is performed with the above-stated relative movement speed also lowered in the same manner.

The cleaning method according to the invention is carried out in the recording and/or reproducing apparatus of Example 1 shown in FIG. 1. However, the method of the invention is not limited to such application and may be carried out in the form of an independent specialized cleaning apparatus. In that instance, the specialized cleaning apparatus comprises a sheet or tape specialized for the purpose of cleaning and an arrangement to receive a soiled head removed from a recording and/or reproducing apparatus for cleaning. In cleaning, the head is set to confront the cleaning sheet or tape. Under that condition, a relative movement is allowed to take place between the cleaning sheet or tape and the head at a speed lower than the speed of relative movement which takes place between a magnetic sheet or tape and the head in a recording and/or reproducing apparatus.

Embodiment Example 2

Figure 2:
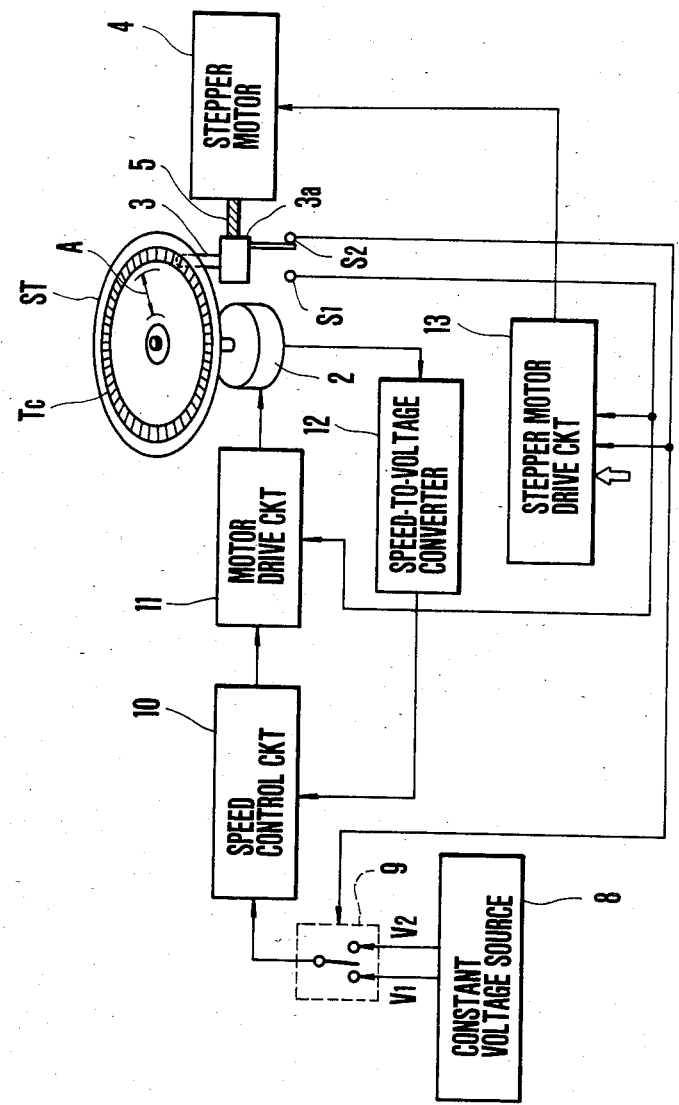
FIG. 2 is a block diagram showing a second embodiment example of the invention.

FIG. 2 shows by way of example a recording and/or reproducing apparatus which is a second embodiment (Example 2) which is arranged to be capable of automatically setting recording, reproducing and cleaning modes. In this drawing, the parts indicated by the same reference numerals as those shown in FIG. 1 are fundamentally the same as the corresponding parts that have been described in the foregoing. Referring to FIG. 2, the embodiment includes switches S1 and S2. The switch S1 is responsive to the movement of the head carrier 3a and operates when the head 3 comes to a position which is farther by one track width than the last recording track within the recording area A on the inner circumferential side of the sheet ST after passing the last track. The switch S2 is also responsive to the head carrier 3a and is arranged to operate when the head 3 reaches the position of the cleaning track.

A constant voltage source 8 is arranged to produce a first voltage V1 which causes the motor 2 to rotate at a low speed for cleaning and to produce a second voltage V2 which causes the motor 2 to rotate at a high speed for information recording or reproduction. A switch circuit 9 is arranged to select one of these output voltages V1 and V2 for the speed control circuit 10. As long as the switch S2 is in an operative state, i.e. as long as the head 3 is in the position confronting to the cleaning track Tc of the sheet ST, the switch circuit 9 selects the first output voltage V1 in response to the switch S2. With the exception of that, the switch circuit 9 is arranged to select the second voltage V2. Further, the motor drive circuit 11 is arranged to keep the motor 2 in repose in response to the switch S1 as long as the switch S1 is in operation, i.e. as long as the head 3 is in the deviated position away from the recording area A on the inner circumferential side of the sheet ST. The stepper motor drive circuit 13 is responsive to the switches S1 and S2 and is arranged to inhibit the stepper motor 4 from operating further when each of the switches S1 and S2 operate. The stepper motor drive circuit 13 is also arranged to actuate the stepper motor 4 to bring the head 3 to the cleaning track Tc in response to a reset instruction given from control means which is not shown. The stepper motor drive circuit 13 is further arranged to operate the stepper motor 4 in response to a track designating signal to bring the head 3 to a designated track. With the embodiment arranged in this manner, when a reset instruction is given to the stepper motor drive circuit 13 while, for example, the apparatus is in repose, the stepper motor drive circuit 13 operates the stepper motor 4 to bring the head 3 to the position confronting the cleaning track Tc. During the head position shifting process, when the switch S2 comes to operate, the drive circuit 13 stops the stepper motor 4 from operating in response to the switch S2. Accordingly, the apparatus is inhibited from operating when the head 3 is brought to the cleaning track Tc.

When the apparatus again begins to operate, with the head 3 located at the cleaning track Tc and the switch S2 in an operative state, the switch circuit 9 selects, for the speed control circuit 10, the first voltage V1 produced from the constant voltage source 8. With the first voltage V1 selected, the motor rotates at a low speed and the head 3 is cleaned in the same manner as in Example 1 shown in FIG. 1.

After that, when a track designating signal is applied to the stepper motor drive circuit 13 under a recording or reproducing mode, the drive circuit 13 causes the stepper motor 4 to operate to bring the head 3 to a designated track. Then, since the switch S2 becomes inoperative upon arrival of the head to the designated track, the switch circuit 9 comes to select the second voltage V2 of the constant voltage source 8 for the speed control circuit 10. Accordingly, the motor 2 comes to rotate at the high speed required for information recording or reproduction.

Further, during a recording or reproducing operation, when the switch S1 operates with the head 3 having come away from the recording area A, the motor drive circuit 11 responds to the change of the switch S1 and comes to bring the motor 2 to a stop. Meanwhile, the stepper motor drive circuit 13 comes to inhibit the stepper motor 4 from operating further.

Embodiment Example 3

In Example 3, a member which is provided with a cleaning material and is arranged in the form of a specialized cleaning sheet or tape or in the form of a recording medium including a cleaning track is placed within a cassette. Example 3 is provided with discrimination means for distinguishing the cassette containing the cleaning member or material therein from other cassettes not containing the cleaning member. This discrimination means enables a detection means provided on the apparatus to distinguish it from others when it is mounted on the apparatus. With the apparatus loaded with the cassette containing the cleaning member, the detection means causes the speed of the relative movement between the head and the cleaning member to be slower than the speed of the relative movement which takes place between the head and a recording medium during a recording or reproducing operation. The head, therefore, is cleaned at this slow speed.

Figure 3A:
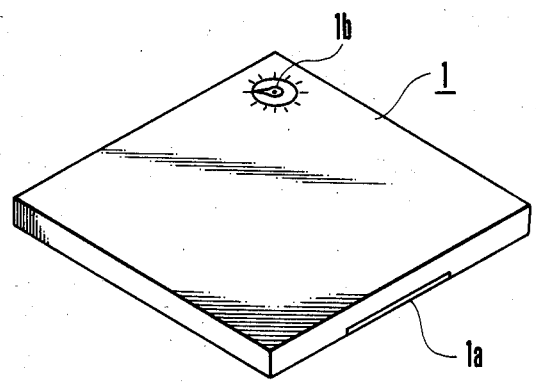
FIGS. 3A and 3B are oblique view showing by way of example sheet containing cassettes usable for third, fourth, sixth, seventh, eighth, ninth and tenth embodiment examples.
Figure 3B:
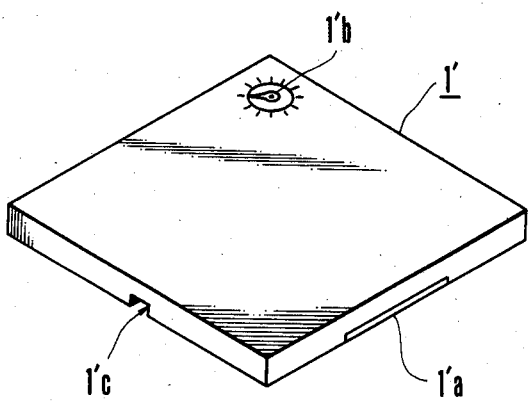

FIGS. 3A and 3B show the arrangement of the above-stated discrimination means which is provided, for example, on a cassette containing a sheet. FIG. 3A shows a cassette of a recording medium which is provided with no cleaning material. FIG. 3B shows a cassette which is provided with a cleaning material. The discriminating arrangements of the two are of course reversible. In the case of FIG. 3A, the cassette contains a sheet, such as a magnetic sheet, which is not provided with the cleaning material. The cassette shown in FIG. 3B on the other hand contains either a specialized cleaning sheet or a sheet, such as a magnetic sheet, which is provided with a cleaning track. In these drawings, reference numerals 1a and 1'a indicate openable dust-proof shutters; and 1b and 1'b track indicating counters. The cassette 1' which contains the sheet with the cleaning material is provided with a notch 1'c in the housing thereof while the other cassette 1 which contains the sheet having no cleaning material is provided with no such notch.

Meanwhile, the body of the recording and/or reproducing apparatus is provided with some detection means, such as a mechanical means, which discriminates the cassette having the cleaning material from the cassette having no cleaning material by detecting the presence or absence of the above-stated notch. This detection means will be further described later herein. The arrangement for discriminating one cassette from the other may be replaced with one of various conceivable arrangements. For example, the above-stated notch 1'c may be replaced with a hole provided in a prescribed position of the cassette containing the sheet with the cleaning material to permit detection of the presence or absence of the hole by means of a photo-coupler. In another possible alternative, magnetic matter is attached to a prescribed part of the cassette containing the sheet with the cleaning material and the presence or absence of the magnetic matter is arranged to be detected by means of a magnetic sensitive element. Conversely, the notch, the hole, the magnetic matter or some other discriminating means may be provided on the cassette containing the sheet which is not provided with the cleaning material.

Figure 4:
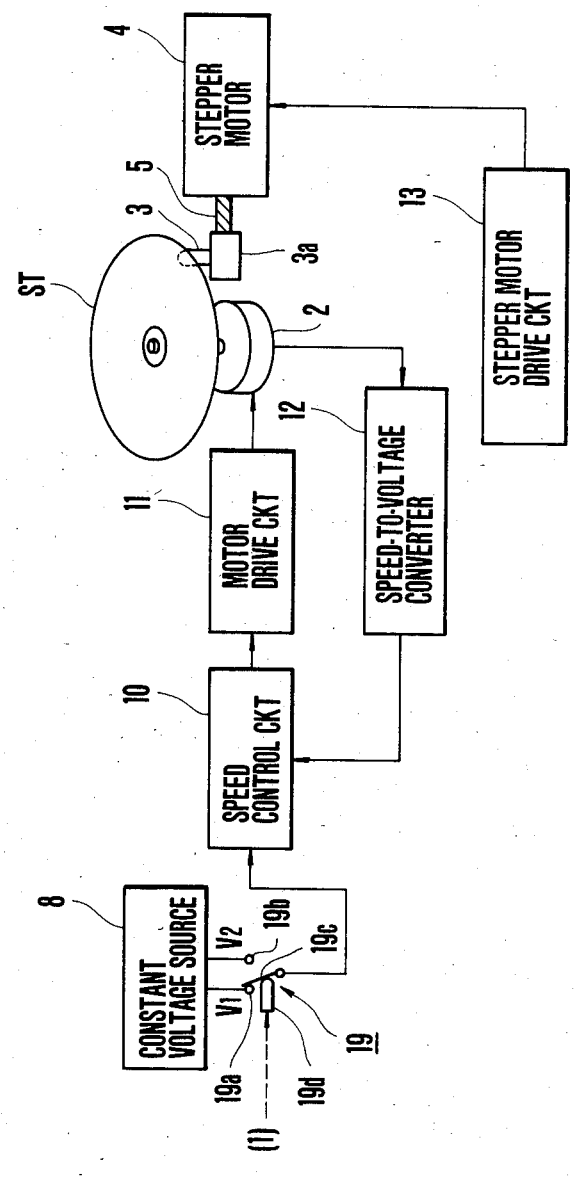
FIG. 4 is a block diagram showing a third embodiment example of the invention.

FIG. 4 shows by way of example an apparatus (Example 3) which is capable of discriminating the use of the cassette provided with the discriminating means and which is arranged to perform cleaning of the head by reducing the speed of the relative movement between the head and the member having the cleaning material when the apparatus is loaded with the cassette of that type. In this example, the member contained in the cassette is a sheet and the presence or absence of the cleaning material is detected through the presence or absence of the above-stated notch. However, as will be apparent from the following description as well as from the description given in the foregoing, the present invention is applicable also to other cases where members other than a sheet and some discriminating means other than the notch are employed.

In the case of FIG. 4, the sheet contained in the cassette 1' shown in FIG. 3B is a specialized cleaning sheet and the apparatus is arranged to discriminate the cassette 1' from the cassette 1 which is shown in FIG. 3A and contains a sheet having no cleaning material. The parts indicated in FIG. 4 with the same reference numerals are fundamentally the same as the corresponding parts that have been described in the foregoing. In FIG. 4, a numeral 19 indicates a change-over switch for selecting one of the voltages V1 and V2 produced from the constant voltage source 8 for the speed control circuit 10. When the above-stated cassette 1' which has the notch 1'c as shown in FIG. 3B is loaded on the apparatus, the change-over switch 19 selects the first voltage V1. The change-over switch 19 selects the second voltage V2 when the apparatus is loaded with the cassette 1 which does not have the notch as shown in FIG. 3A. The voltage V1 or V2 thus selected is supplied to the speed control circuit 10. For that purpose, the change-over switch 19 is provided with terminals 19a and 19b for receiving the voltages V1 and V2 and also has a moving contact piece 19c and a detection pin 19d. The detection pin 19d is not pushed when none of the cassettes 1 and 1' are loaded and also is not pushed when the cassette 1' is loaded because of the notch 1c. Under that condition, therefore, the moving contact piece 19c is in contact with the terminal 19a by virtue of its own elasticity. When the cassette 1 is loaded on the other hand, the absence of the notch causes the cassette 1 to push the detection pin 19d. Then, in this instance, the moving contact piece 19c comes into contact with the other terminal 19b against its elasticity.

The apparatus which is arranged as shown in FIG. 4 operates as follows: When the cassette 1' which contains a specialized cleaning sheet is loaded, the contact piece 19c of the switch 19 is allowed to stay in contact with the terminal 19a on account of the presence of the notch 1'c. Therefore, the first voltage V1 (which is a lower voltage) is supplied from the constant voltage source 8 to the speed control circuit 10. The motor 2 then causes the sheet ST (a cleaning sheet in this instance) to rotate at the lower speed for cleaning the head 3. The cleaning operation is carried out through a relative movement between the head 3 and the sheet ST with the head confronting the cleaning material which covers almost entire reverse surface of the sheet ST as viewed on the drawing. In this instance, the purpose of cleaning can be attained as long as the head 3 is in a position opposed to the part of the sheet ST where the cleaning material is arranged. However, it is preferable to control the position of the head 3 to have it at a point where cleaning can be accomplished most efficiently in terms of the rotation velocity of the sheet ST which is determined by the voltage V1. In cases where the position of the head for cleaning is restricted by some reason, the voltage V1 is preferably set at a value that meets the above-stated condition.

When the cassette 1 which contains no cleaning material therein is loaded, the detection pin 19d is pushed by a part of the housing of the cassette 1. This causes the contact piece 19c to come into contact with the terminal 19b. Then, the second voltage (a higher voltage) is supplied from the constant voltage source 8 to the speed control circuit 10. The motor 2 rotates the sheet ST (which is a magnetic sheet having no cleaning material in this instance) at a high speed for recording and reproduction. The position of the head 3 relative to the sheet ST and signal recording or reproduction are accomplished in a known manner.

In the cleaning mode, the relative movement of the head and the sheet ST is preferably brought to a stop when the relative movement has continued for a prescribed period of time. In view of this, it is preferable to stop the drive circuit 11 from operating further by means of some timing device such as a time constant circuit after the lapse of a prescribed period of time from the start of the supply of the lower voltage V1 from the constant voltage source 8.

Embodiment Example 4

Example 4 is arranged as shown in FIG. 5. In this case, the sheet contained in the cassette 1' shown in FIG. 3B is a magnetic sheet which is provided with a cleaning track Tc. The apparatus is arranged to discriminate this cassette 1' from the cassette 1 containing a sheet which has no cleaning material. In FIG. 5, the parts indicated by the same reference numerals as those described in the foregoing are arranged and function fundamentally in the same manner as in the preceding examples. This example includes a notch detection signal source 6 which is arranged to detect the presence or absence of the notch 1'c in the cassette 1 or 1' which is loaded on the apparatus and to produce a signal accordingly. Also included is a switch S3 which is arranged to operate according to the presence or absence of the notch 1'c in the cassette 1 or 1'. Signals from the detection signal source 6 and the switch S2 are received by an AND circuit 7. The output of the AND circuit 7 is supplied to the switch circuit 9. This AND circuit 7 causes the switch circuit 9 to select the first voltage V1 produced from the constant voltage source 8 only when the cassette loaded has the notch 1'c, i.e. only when there is produced a signal indicating the use of cassette 1' and the switch S2 is operated to have the head 3 at the cleaning track Tc. With the exception of that, the AND circuit 7 controls the switch circuit 9 to select the second voltage V2 produced from the constant voltage source 8. In contrast with the apparatus shown in FIG. 2, the apparatus shown in FIG. 5 is provided with the AND circuit 7 which brings about the cleaning mode only when the head 3 is in a position confronting the cleaning track Tc with the apparatus loaded with the cassette 1' containing the magnetic sheet which has the cleaning track Tc. Thus, the head 3 can be cleaned only under the above-stated conditions.

Figure 6:
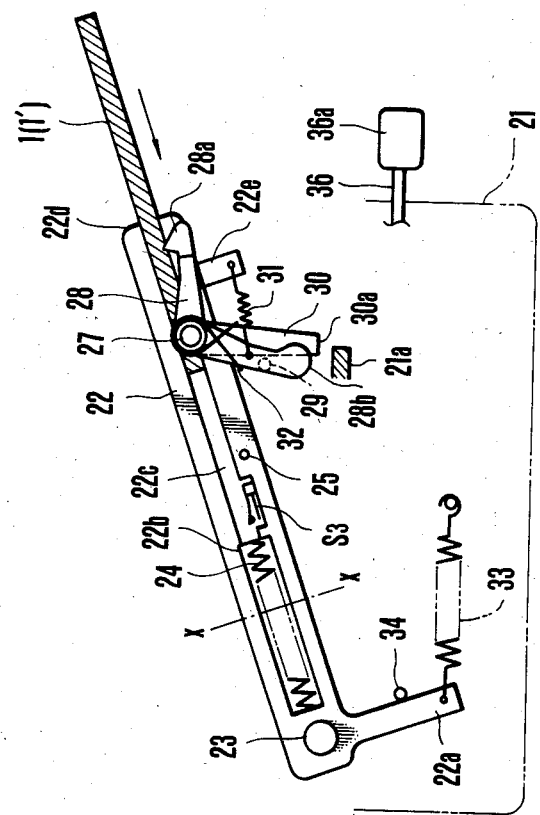
FIG. 6 shows an example of cassette loading arrangement usable for the fourth, seventh, eighth, ninth and tenth embodiments of the invention.

FIG. 6 shows one example of the cassette loading part of the apparatus shown in FIG. 5. A reference numeral 21 denotes the body of the recording and/or reproducing apparatus; 22 denotes a cassette receiving part; and 1 or 1' denotes the cassette. The cassette 1 or 1' is loaded in the direction of arrow. The above-stated switch S3 is disposed at a recess which is formed within the cassette receiving part 22. When the cassette 1 or 1' is loaded, one of the contact pieces of the switch S3 is pushed by the lower surface of the housing of the cassette in the case of the cassette 1 which is not provided with the notch 1'c and the two contact pieces of the switch S3 are then closed. However, the two contact pieces of the switch 3 are arranged to remain in an open state when the loaded cassette is the cassette 1' which is provided with the notch 1'c. To simplify the illustration of FIG. 6, the position of the switch S3 is shown in the middle part of the inner space 22c of the cassette receiving part 22. However, in order that the switch S3 comes to operate only when the cassette 1 or 1' has been completely loaded at the receiving part 22, the switch S3 is disposed preferably close to a boundary between a spring containing space 22b and the cassette containing space 22c of the cassette receiving part 22. The cassette receiving part 22 is connected to the body 21 of the apparatus via a shaft 23. A spring 33 is arranged between a branched portion 22a of the cassette receiving part 22 and the body 21 to exert its urging force on the cassette receiving part 22 to urge it to turn counter-clockwise on the shaft 23. However, this turning movement is restricted by a pin 34. A spring 24 is disposed in the spring containing space 22b of the cassette receiving part 22. The vertical dimension of the space 22b is larger than that of another space 22c and the elongating movement of the spring 24 is limited to the inside of the space 22b.

The cassette receiving part 22 is provided with a locking pin 25 which is arranged to engage a hook part of a receiving part locking lever which is not shown but is provided on the body 21. Further provided on the cassette receiving part 22 is a shaft 27 which pivotally carries a cassette locking lever 28 and a stopping lever 30 to have them rotatable thereon. The levers 28 and 30 are urged together by means of a spring 32. However, the two levers are arranged to rotate together normally with some opening angle kept between them because of a pin 29 which is provided on the lever 28. A spring 31 is arranged between the cassette locking lever 28 and a downward projecting portion 22e of the cassette receiving part 22 to urge the levers 28 and 30 to turn counter-clockwise on the shaft 27. The turning movement of these levers is restricted by a pin which is not shown but is provided on the cassette receiving part 22. The cassette locking part 28a of the lever 28 is thus arranged to allow the cassette 1 or 1' to be insertable, removable and lockable without difficulty. The end 28b of the lever 28 is arranged to abut on a cam part (not shown) of an ejection lever 36 during a cassette unloading operation which will be described later herein. The body 21 is provided with a stopping part 21a. A reference numeral 30a denotes the fore end of the stopping lever 30. The cassette loading and unloading operation of the arrangement shown in FIG. 6 is as follows:

During the process of inserting the cassette 1 or 1' through a loading port 22d in the direction of the arrow, the cassette receiving part 22 cannot be closed on the body 21 by turning it clockwise before completion of insertion, because: The fore end 30a of the stopping lever 30 comes to abut on an abutting part of the body 21 to prevent premature closing. When the cassette 1 or 1' is further inserted and the left end of it reaches a point within the spring containing space 22b indicated by a one dot chain line X-X, the spring 31 causes the locking lever 28 to turn counterclockwise. The locking part 28a of the lever 28 then comes to lock the right end of the cassette 1 or 1' and the spring 24 is charged. At that time, the stopping lever 30 also turns counterclockwise. Therefore, the fore end 30a no longer abuts on the stopping part 21a of the body 21. This permits the cassette receiving part 22 to be closed on the body 21. The locking pin 25 then engages the hook portion of the above-stated receiving part locking lever of the body 21. Under this condition, the switch S3 opens or closes according to the presence or absence of the notch 1'c.

In taking out the cassette 1 or 1', the operation button 36a of the ejection lever is pushed to the left as viewed on FIG. 6. Then, the locking pin 25 is disengaged from the hook portion of the receiving part locking lever which is not shown. This allows the cassette receiving part 22 to be turned counterclockwise by the spring 33. Concurrently with this, one end 28b of the locking lever 28 is pushed by a cam portion (not shown) of the ejection lever 36 and the locking lever is thus caused to turn clockwise. Then, the cassette 1 or 1' is released from a locked state by the fore end 28a of the locking lever 28. The spring 24 then causes the cassette 1 or 1' to protrude from the loading port 22d by bringing the left end thereof at least to the boundary between the spaces 22b and 22c. When the cassette 1 or 1' is pulled out further, the switch S3 which has been closed when the cassette 1 is loaded comes to open. Meanwhile, the stopping lever 30 tries to turn clockwise following the turning movement of the cassette receiving part 22. However, the clockwise turn of the stopping lever 30 is restricted by the stopping part 21a of the body 21 and the stopping lever 30 moves upward in a state of being in contact with the stopping part 21a. When the lever 30 passes the stopping part 21a, the spring 32 causes it to turn and to impinge on the pin 29 which is provided on the locking lever 28.

Embodiment Example 5

Figure 7:
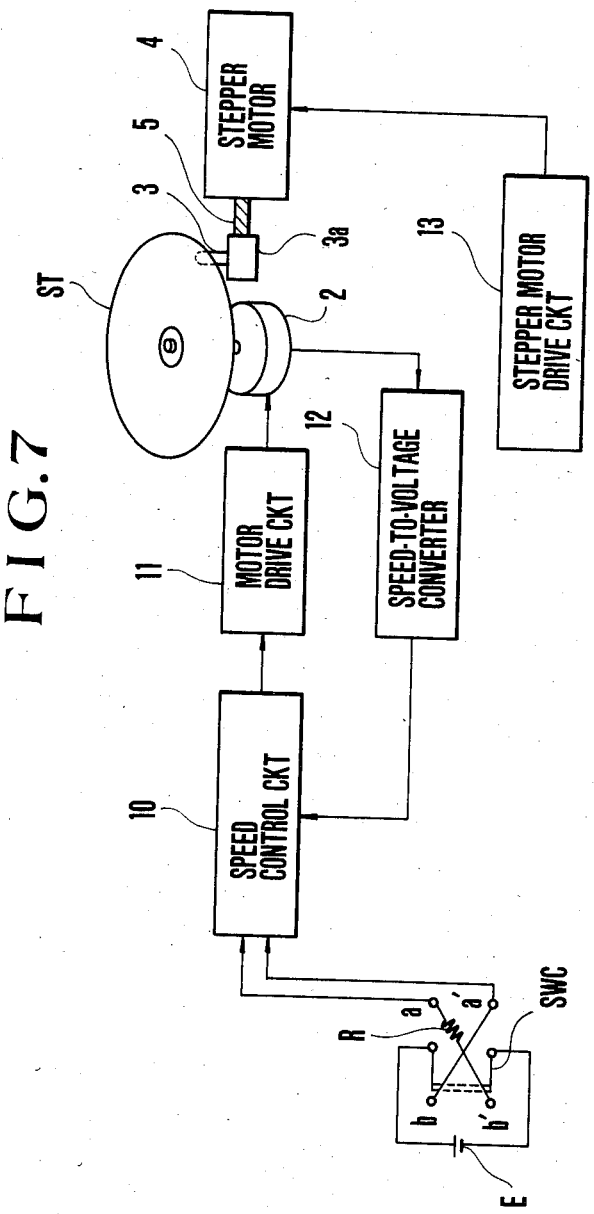
FIG. 7 is a block diagram showing a fifth embodiment example of the invention.

In Example 5 which will be described below, the head is cleaned by rotating a cleaning member relative to the head in a direction reverse to the direction in which a recording medium is rotated. The example is arranged as shown in FIG. 7. In this case, a cassette containing a specialized cleaning sheet is arranged to be distinguished by the operator from a cassette containing a recording medium which is provided with no cleaning material with, for example, some identification mark provided on the surface of the cassette. The motor is rotated in one direction or the other according to the cassette loaded. In FIG. 7, the reference numerals which are same as those used in the foregoing description denote fundamentally the same parts.

Referring to FIG. 7, a reference symbol ST denotes either a specialized cleaning sheet or a magnetic sheet which is provided with no cleaning material. The cleaning sheet ST has a lapping material applied to one side (the reverse side as viewed on FIG. 7) of the sheet covering nearly the whole surface of that side as cleaning material. The motor 2 is provided with a voltage source E. The voltage produced from the voltage source E is supplied to the speed control circuit 10 via a change-over switch SWC in one of opposite polarities. The change-over switch SWC supplies the output voltage of the voltage source E to the speed control circuit 10 in a first polarity when it is shifted to the terminals a and a' and in a polarity opposite to the first polarity via a resistor R when it is shifted to terminals b and b'. Upon receipt of the voltage of the first polarity from the voltage source E, the speed control circuit 10 controls the motor drive circuit 11 to cause the motor 2 to rotate, for example, in a forward or normal direction. When the voltage supplied from the voltage source E is of the second polarity, the motor drive circuit 11 is controlled to cause the motor to rotate, for example, in a reverse direction. The action to be performed by the resistor R will be described later herein.

The apparatus shown in FIG. 7 operates as follows: In loading the recording and/or reproducing apparatus with a cassette containing a magnetic sheet which has no cleaning material, the operator shifts the switch SWC to the terminals a and a'. Then, the output voltage of the voltage source E is supplied in the first polarity to the speed control circuit 10. The above-stated servo system then causes the motor 2 to rotate in the normal direction at a constant speed. In the meantime, the stepper motor 4 is controlled by the stepper motor drive circuit 13 to move the head 3 in the direction of the radius of the magnetic sheet ST. The head 3 then either record a signal on the magnetic sheet ST or read out a recorded signal from the magnetic sheet ST.

In the case where a cassette containing the specialized cleaning sheet is loaded, the operator shifts the switch SWC to the terminals b and b'. In that instance, the output voltage of the voltage source E is supplied in the second polarity to the speed control circuit 10. Then, if the resistor R is not provided, the motor 2 would be caused to reversely rotate at the same rotation velocity as in the case of the cassette having no cleaning material. Then, the head 3 is cleaned with the cleaning material provided on the specialized cleaning sheet ST. Since the sheet ST is rotated in the direction reverse to the rotating direction of the magnetic sheet, the head 3 and the sheet ST make a relative movement in a direction reverse to the accumulating direction of the soil on the head 3, so that the soil can be efficiently removed from the head.

In that instance, if the resistor R is inserted, the speed control circuit 10 has the input voltage of the second polarity lowered according to the resistance value of the resistor R. Accordingly, the motor 2 is caused to reversely rotate at a lower speed than its rotation in the normal direction. As a result of that, the speed of the relative movement between the cleaning material and the head becomes lower than the speed of the relative movement between the magnetic sheet and the head. Then, the impedimental air film produced between the cleaning sheet and the head during a cleaning operation can be reduced by half or even negated for more effective cleaning by virtue of the lowered speed in the same manner as in the preceding Examples 1-4.

Embodiment Example 6

Figure 8:
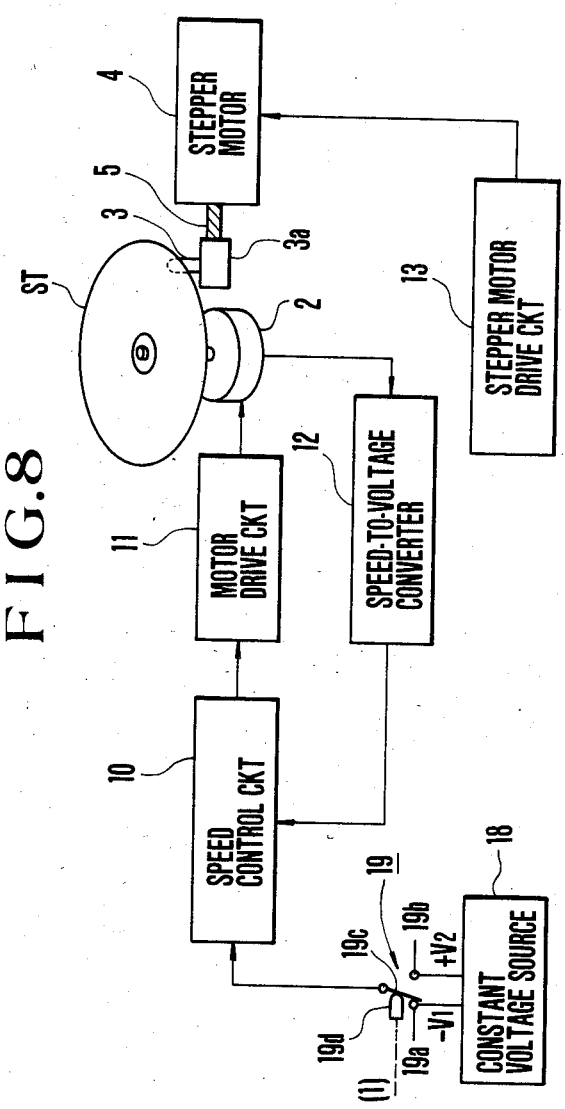
FIG. 8 is a block diagram showing the sixth embodiment example of the invention.

Example 6 is arranged as shown in FIG. 8. The recording and/or reproducing apparatus is arranged to be capable of discriminating the cassettes which are provided with or not provided with the discriminating means as shown in FIGS. 3A and 3B. When the cassette containing the sheet having the cleaning material is detected as have been loaded, the apparatus cleans the head by rotating the sheet contained in the cassette in a direction reverse to the direction employed in recording or reproduction.

In FIG. 8, the reference numerals and symbols which are the same as those used in the description of the preceding examples denote fundamentally the same parts. This example includes a constant voltage source 18 which produces a negative voltage −V1 and a positive voltage +V2. When the negative voltage −V1 is supplied to the speed control circuit 10 via a change-over switch 19, the motor rotates in a reverse direction. When the speed control circuit 10 is supplied with the positive voltage +V2, the motor rotates in a normal direction. The change-over switch 19 is arranged to supply the speed control circuit 10 with the negative voltage −V1 when the apparatus is loaded with the cassette 1' which has the notch 1'c and with the positive voltage +V2 when the apparatus is loaded with the cassette which does not have the notch 1'c.

The operation of the embodiment shown in FIG. 8 is as follows: When the cassette 1' which contains the specialized cleaning sheet is loaded, the presence of the notch 1'c causes the contact piece 19c of the switch 19 to remain in contact with the terminal 19a. Therefore, the negative voltage −V1 is supplied from the constant voltage source 18 to the speed control circuit 10. Accordingly, the motor 2 causes the sheet ST (the cleaning sheet in this instance) to rotate in the direction reverse to the rotating direction for recording or reproduction. The head is cleaned through a relative movement between the head 3 and the cleaning material which covers nearly the whole surface of the sheet ST on the reverse side thereof as viewed on FIG. 8. The cleaning purpose is attainable with the head 3 set in a position confronting the cleaning material on the sheet ST. It is, however, preferable to have the position of the head 3 controlled to have the cleaning operation most efficiently accomplished in relation to the rotation velocity of the sheet ST which is determined by the voltage V1. In cases where the position of the head 3 for cleaning is restricted by some other conditions, the voltage V1 is preferably adjusted to a suitable value to meet the above-stated condition. Especially, in cases where a sufficient cleaning effect is not attainable due to an air film formed by a high rotation velocity of the sheet ST as has been mentioned in relation to Examples 1–4, the voltage V1 is preferably arranged to be lower than the voltage V2 to reduce the rotation velocity of the sheet ST relative to the head 3 to a suitable value.

When the cassette 1 is loaded on the other hand, the detection pin 19d of the switch 19 is pushed by a part of the housing of the cassette 1. With the pin 19d thus pushed, the contact piece 19c comes into contact with the terminal 19b. This causes the positive voltage +V2 to be supplied from the constant voltage source 18 to the speed control circuit 10. As a result of that, the motor 2 causes the sheet ST (a recording sheet having no cleaning material in this instance) to rotate in the normal or forward direction for recording or reproduction. Then, the position control on the head 3 relative to the sheet ST and signal recording or reproduction by the head 3 are accomplished in a known manner.

In the cleaning mode of the apparatus, the relative movement between the head 3 and the sheet ST is preferably arranged to be brought to a stop when the relative movement has continued for a prescribed length of time. It is, therefore, preferable to have some timing device such as a time constant circuit or the like arranged to render the drive circuit 11 inoperative after the lapse of a prescribed length of time from the commencement of the supply of the negative voltage −V1 from the constant voltage source 18.

Embodiment Example 7

Figure 9:
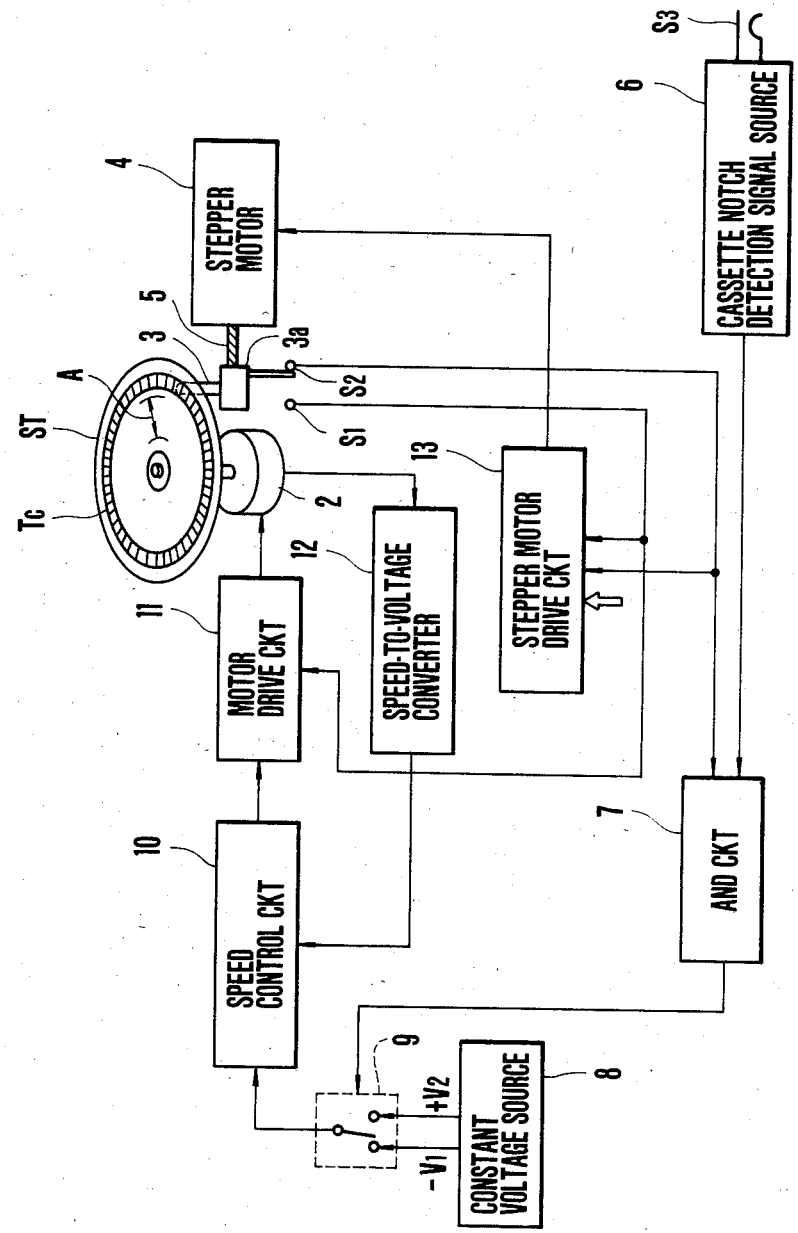
FIG. 9 is a block diagram showing the seventh embodiment example of the invention.

The seventh embodiment example of the invention is arranged as shown in FIG. 9. In this case, the sheet contained in the cassette 1' shown in FIG. 3B is a magnetic sheet having a cleaning track Tc. The apparatus is arranged to discriminate this cassette 1' from the cassette 1 containing a magnetic sheet which has no cleaning material. In FIG. 9, the parts indicated by the same reference numerals and symbols as those used in the foregoing description are arranged fundamentally in the same manner as the corresponding parts described in the foregoing.

The apparatus shown in FIG. 9 is provided with the AND circuit 7 and the switch circuit 9, which are arranged to operate such that: The negative output voltage −V1 produced from the constant voltage source 8 is selected only when the head 3 is set in a position confronting the cleaning track Tc after the apparatus is loaded with the cassette 1' containing the sheet ST which has the cleaning track Tc. The cleaning mode which has been described in the foregoing obtains with the negative voltage −V1 thus selected and the motor 2 is caused to rotate in the reverse direction. With the exception of this, the apparatus operates in the same manner as Example 4 which is shown in FIG. 5.

Further, the arrangement of the cassette loading part shown in FIG. 6 is applicable as it is to this embodiment example.

Embodiment Example 8

The eighth embodiment example of the invention is arranged as shown in FIG. 10. In this example, the wear of the head due to cleaning is arranged to be held to a minimal degree by automatically terminating the head cleaning operation at the end of a predetermined period of time. A cassette containing a specialized cleaning sheet therein and a cassette containing a magnetic sheet having no cleaning material are discriminated from each other by the presence or absence of the notch 1'c shown in FIG. 3B. When the former is loaded, the sheet is automatically stopped from rotating after the lapse of the predetermined period of time. In FIG. 10, the parts indicated by the same reference symbols and numerals as those used in the foregoing description are fundamentally the same as the corresponding ones used in the preceding embodiment examples. This embodiment example includes a constant voltage source 8' which is provided for the motor 2 and is arranged in the same manner as that of FIG. 1. The voltage is supplied to the motor 2 from the constant voltage source 8' via the speed control circuit 10 and the motor drive circuit 11 and the motor is thus caused to rotate at a predetermined speed. The apparatus is provided with a switch S3 which is arranged to detect the notch provided in the cassette in the same manner as in the example described with reference to FIGS. 5 and 6; and a timer 16 which operates as a timing device. The timer 16 is composed of a comparison circuit CP and a C-R time constant circuit which is arranged to operate when the switch S3 is off and to remain inoperative when the switch S3 is on. A resistor R1 which is series connected to the constant voltage source 8' and a capacitor C1 have a connection point between them connected to the inversion input terminal of the comparison circuit CP. A connection point between resistors R2 and R3 is connected to the non-inversion input terminal of the comparison circuit CP. The output terminal of the comparison circuit CP is connected to the motor drive circuit 11. The switch S3 is parallel connected to the capacitor C1. A reference symbol SM denotes a power source switch.

When the switch S3 is turned on, the power source switch SM operates to keep the non-inversion input terminal of the comparison circuit CP at a given positive potential determined by the resistors R2 and R3. Meanwile, the inversion input terminal is kept at a ground potential. Therefore, the output level of the comparison circuit CP is high. Then, under the control of the speed control circuit 10, the motor drive circuit 11 causes the motor 2 to rotate at a given speed. Whereas, when the switch S3 is off, the output of the comparison circuit CP is at a high level in the beginning. However, the capacitor C1 is charged by the constant voltage source 8' through the resistor R1 and, when the potential thereof comes to exceed the above-stated positive potential determined by the resistors R2 and R3, the output level of the comparison circuit CP becomes low. As a result of that, the motor drive circuit 11 operates to stop the motor 2 from rotating. The apparatus shown in FIG. 10 operates as follows:

When the apparatus is loaded with the cassette 1' containing the specialized cleaning sheet, the switch S3 is kept off due to the presence of the notch 1'c of the cassette 1'. The timer 16 is then set into an operative state. When the power source switch SM is operated under this condition, the motor drive circuit 11 first acts to rotate the motor 2 as the output level of the comparison circuit CP is high in the beginning as mentioned above. However, after the lapse of a given length of time "t" determined by the resistor R1 of the time constant circuit, the time constant due to the capacitor C1 and the non-inversion input potential of the comparison circuit CP, the output of the comparison circuit CP changes to a low level. Accordingly, the motor drive circuit 11 operates to bring the rotation of the motor 2 to a stop. When the cassette 1' containing the specialized cleaning sheet is loaded, therefore, the sheet is allowed to rotate only for the above-stated length of time "t". Therefore, the head 3 can be cleaned with the cleaning material stuck to the cleaning sheet ST (on the reverse side of the sheet as viewed on FIG. 10) with this length of time "t" set at a minimum value required for attaining the cleaning purpose. This arrangement effectively minimizes the wear of the head 3. In this instance, the cleaning purpose is attainable as long as the head 3 is set face to face against the part of the sheet ST having the cleaning material. However, the position of the head 3 is preferably controlled in such a way as to ensure the most efficient cleaning operation on the head 3 in relation to the rotation velocity of the sheet ST. If the position of the head 3 for cleaning is restricted by some reason, the rotation velocity of the sheet ST may be selected to meet the above-stated condition. The selection of the rotation velocity of the sheet ST will be described later herein.

When the apparatus is loaded with the cassette 1 containing the recording sheet which is not provided with any cleaning material on the other hend, the switch S3 is kept on because of the absence of the above-stated notch. The output level of the comparison circuit CP becomes continuously high. Under the control of the speed control circuit 10, the motor drive circuit 11 causes the motor 2 to continuously rotate at a predetermined speed. Under this condition, the stepper motor 4 is controlled by the stepper motor dirve circuit 13 and shifts the head 3 over the recording sheet ST in the direction of radius of the sheet through the mechanism 5 and the head carrier 3a. As a result of that, the head 3 either record a signal on the magnetic sheet or read out a recorded signal from the magnetic sheet.

In the embodiment example shown in FIG. 10, the cassette 1' containing the specialized cleaning sheet and the cassette 1 containing a magnetic sheet having no cleaning material are mechanically discriminated from each other by the absence or presence of the notch 1'c. However, this arrangement may be replaced with another arrangement wherein the operator is enabled to discriminate one cassette from the other by some mark or the like provided on the surface of the cassette and the operator turns off the switch S3 when the cassette 1' is loaded and turns on the switch when the cassette 1 is loaded before the power source switch SM is operated. In the former case, the timer 16 is arranged to stop the motor 2 from rotating after the lapse of the predetermined period of time "t". In the latter case, however, the timer can be allowed to operate in the ordinary recording or reproducing mode.

Embodiment Example 9

In the case of the apparatus shown in FIG. 10, if the cleaning sheet ST is allowed to rotate for cleaning the head 3 at the same speed as the rotation speed employed in recording or reproduction, the cleaning operation on the head 3 might not be effectively accomplished due to an air film formed between the head 3 and the cleaning sheet ST. In such a case, it is preferable to lower the rotation speed of the cleaning sheet ST.

Figure 11:
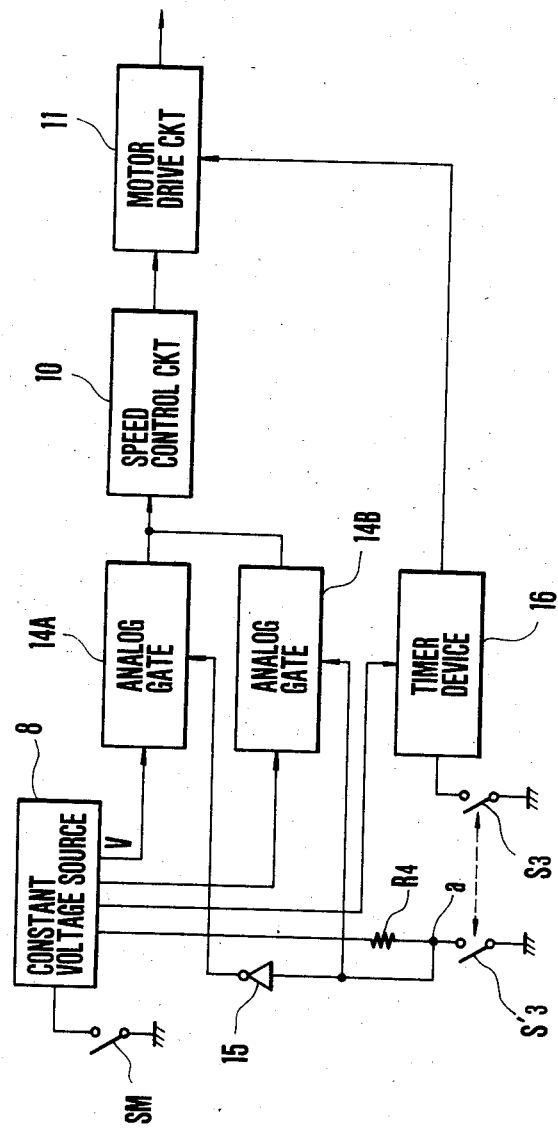
FIG. 11 is a block diagram of the ninth embodiment example showing parts thereof differing from the eighth embodiment example shown in FIG. 9.

Therefore, the ninth embodiment example of the invention which is shown in FIG. 11 is arranged to have the sheet rotating motor rotate at a high speed in the recording or reproducing mode and at a low speed within a limited period of time in the head cleaning mode. FIG. 11 shows the essential parts of the embodiment, in which: the constant voltage source 8 is arranged to produce a voltage V2 required for rotating the motor 2 at a high speed for recording or reproduction and a voltage V1 for rotating the motor 2 at a low speed for cleaning. The voltage V1 is lower than the voltage V2. The higher voltage V2 is supplied to the speed control circuit 10 via an analog gate 14A while the lower voltage V1 is supplied to the speed control circuit 10 via another analog gate 14B. A switch S'3 is arranged to turn on and off in synchronism with the switch S3 and is connected to the constant voltage source 8 via a resistor R4. The potential of a connection point "a" between the switch S'3 and the resistor R4 becomes high when the switch S'3 turns off and becomes low when the switch turns on. The potential of the connection point "a" is applied to the analog gate 14B and turns the gate 14B on when it is at a high level. Further, the potential of the connection point "a" is inverted at an inverter 15 and is then applied to the other analog gate 14A. The gate 14A turns on when the output level of the inverter 15 is high, i.e. when the potential of the connection point "a" is at a low level.

With the embodiment arranged as described above, the switches S3 and S'3 are off when the cassette 1' containing the specialized cleaning sheet is loaded. In that instance, therefore, the analog gate 14A turns off and the analog gate 14B turns on. The lower voltage V1 is supplied from the constant voltage source 8 to the speed control circuit 10. The motor 2 and, accordingly, the sheet ST (the specialized cleaning sheet in this instance) are caused to rotate at a low speed. Therefore, the head can be efficiently cleaned with the cleaning material provided on the sheet ST without being hindered by the above-stated air film. In addition to that, the timer 16 is arranged to stop the sheet ST from rotating after the lapse of a predetermined length of time "t" in the same manner as in the case of FIG. 10.

Meanwhile, when the cassette 1 containing a magnetic sheet which is provided with no cleaning material is loaded, the switches S3 and S'3 are turned on. Then, the analog gate 14A turns on and the analog gate 14B off. The timer 16 becomes inoperative. The higher voltage V2 is supplied from the constant voltage source 8 to the speed control circuit 10. The motor 2 and the sheet ST (a magnetic sheet in that instance) rotate at a high speed for recording or reproduction.

In an example of modification of the apparatus shown in FIG. 11, the voltages V1 and V2 are arranged to be of opposite polarities as in the case of the apparatus shown in FIG. 8. For example, the voltage V1 is arranged to be of the negative polarity while the voltage V2 is arranged to be of the positive polarity. When the apparatus is loaded with the cassette 1' containing the specialized cleaning sheet, the motor 2 and, accordingly, the sheet ST are caused to rotate in the head cleaning direction which is reverse to the direction for recording or reproduction. Further, in this instance, these voltages may be arranged to be in the relation of $|V1| < |V2|$.

Embodiment Example 10

In the tenth embodiment example which is arranged as shown in FIG. 12, the sheet contained in the cassette 1' of FIG. 3B is a magnetic sheet having a cleaning track Tc. This cassette 1' and the cassette 1 of FIG. 3A containing a magnetic sheet which is provided with no cleaning material are discriminated from each other. When the apparatus is loaded with the former, the cleaning mode operation in which the sheet is allowed to rotate with the head and the cleaning track set face to face is arranged to come to an end within a predetermined length of time.

FIG. 12 uses the same reference numerals and symbols in showing the parts that are arranged and function fundamentally in the same manner as the corresponding parts employed in the preceding examples of embodiment. In the apparatus shown in FIG. 12, an AND circuit 7 controls a timer 16 to operate only when the apparatus is loaded with the cassette 1' and the head 3 is opposed to the cleaning track Tc. The apparatus includes a stop circuit 17 arranged to cause the motor drive circuit 11 to stop the motor 2 from rotating. The stop circuit 17 operates to stop the motor 2 when time count by the timer 16 comes to an end and when the switch S1 comes to operate, i.e. when the head 3 comes out of the recording area A on the inner circumferential side of the sheet ST.

The AND circuit 7, the timer 16 and the stop circuit 17 of the apparatus shown in FIG. 12 are thus arranged to allow the motor 2 to rotate for a predetermined length of time to have the head 3 cleaned for the predetermined length of time only when the apparatus is loaded with the cassette 1' having the notch 1'c, i.e. containing the sheet ST which is provided with the cleaning track Tc and when the head 3 is positioned to face this cleaning track Tc under that condition.

Further, the cassette loading arrangement shown in FIG. 6 may be used as it is for the apparatus of FIG. 12.

While specific embodiments of the invention have been shown and described in detail to illustrate the application of the inventive principles, it will be understood that the invention may be embodied otherwise without departing from such principles.

What I claim:

1. A method of cleaning a magnetic head, said head being adapted for recording signals on a flexible magnetic recording medium and/or reproducing the signals from the recording medium when the head and the medium are relatively moved at a predetermined first relative speed to form an air spacing therebetween, said method comprising the steps of:
    (A) facing said head with a head cleaning member which is flexible; and
    (B) relatively moving said head and said cleaning member at a second relative speed lower than said first relative speed so that the head and the cleaning member are substantially in contact with each other.

2. The method according to claim 1, further comprising the step of:
    terminating said relative movement between said head and said cleaning member when a predetermined period of time has elapsed from the beginning of said relative movement.

3. An apparatus for cleaning a magnetic head, said head being adapted for recording signals on a flexible magnetic recording medium and/or reproducing the signals from the recording medium when the head and the medium are relatively moved at a predetermined first relative speed to form an air spacing therebetween, said apparatus comprising:
    (A) means for facing said head with a head cleaning member which is flexible; and
    (B) means for relatively moving said head and said cleaning member at a second relative speed lower than said first relative speed so that the head and the cleaning member are substantially in contact with each other.

4. The apparatus according to claim 3, wherein said facing means includes means for relatively positioning said head and said cleaning member so that the head is faced with the cleaning member.

5. The apparatus according to claim 3, further comprising:
    means for restricting said relative movement between said head and said cleaning member to a predetermined period of time.

6. In a recording and/or reproducing system in which signals are recorded on or reproduced from a flexible magnetic recording medium through recording and/or reproducing magnetic head means when said magnetic head means and the recording medium are relatively moved at a first relative speed to form an air spacing therebetween, a method of cleaning said head means comprising the steps of:
(A) facing said head means with a head cleaning member which is flexible; and
(B) relatively moving said head means and said cleaning member at a second relative speed lower than said first relative speed so that the head and the cleaning member are substantially in contact with each other.

7. The method according to claim 6, further comprising the step of:
terminating said relative movement between said head means and said cleaning member when a predetermined period of time has elapsed from the beginning of said relative movement.

8. A recording and/or reproducing apparatus comprising:
(A) magnetic head means for recording signals on a flexible magnetic recording medium and/or reproducing signals from the recording medium;
(B) drive means adapted for moving said recording medium relative to said head means for signal recordation or reproduction and for moving a head cleaning member which is flexible relative to the head means for cleaning the head means; and
(C) control means for causing said drive means to move said recording medium relative to said head means at a first speed to form an air spacing therebetween and for causing the drive means to move said cleaning member relative to the head means at a second speed lower than said first speed so that the head and the cleaning member are substantially in contact with each other.

9. The apparatus according to claim 8, wherein said control means includes means for restricting the driving of said cleaning member by said drive means to a predetermined period of time.

10. The apparatus according to claim 8, wherein said recording medium and said cleaning member are supported by a common support means and wherein said drive means is arranged to drive said support means, said apparatus further comprising:
positioning means for positioning said head means relative to said support means to selectively face the head means with the recording medium and with the cleaning member; said control means being responsive to said positioning means and being arranged to cause said drive means to drive said support means at said first speed when said head means is faced with the recording medium and to cause the drive means to drive the support means at said second speed when the head means is faced with the cleaning member.

11. The apparatus according to claim 8, wherein the apparatus is selectively loadable with said recording medium and wherein said cleaning member, and said control means is responsive to the loading of said recording medium and of said cleaning member and is arranged to cause said drive means to drive the recording medium at said first speed when the apparatus is loaded with the recording medium and to cause the drive means to drive the cleaning member at said second speed when the apparatus is loaded with the cleaning member.

12. In a recording and/or reproducing system in which signals are recorded on or reproduced from a magnetic recording medium which is flexible through recording and/or reproducing magnetic head means when the recording medium is rotated relative to the head means in a first manner, to form an air spacing therebetween, a method of cleaning said head means comprising the steps of:
(A) facing said head means with a head cleaning member which is flexible; and
(B) rotating said cleaning member relative to said head means in a second manner different from said first manner so that the head and the cleaning member are substantially in contact with each other.

13. The method according to claim 12, wherein said first manner includes rotation of said recording medium at a first speed and said second manner includes rotation of said cleaning member at a second speed lower than said first speed.

14. The method according to claim 13, wherein said first manner further includes rotation of said recording medium in a first direction and said second manner further includes rotation of the cleaning member in a second direction opposite to said first direction.

15. The method according to claim 14, wherein said first manner further includes consecutive rotation of said recording medium and said second manner further includes rotation of said cleaning member only for a predetermined period of time.

16. The method according to claim 12, wherein said first manner includes rotation of said recording medium in a first direction and said second manner includes rotation of the cleaning member in a second direction opposite to said first direction.

17. The method according to claim 16, wherein said first manner further includes consecutive rotation of said recording medium and said second manner further includes rotation of said cleaning member only for a predetermined period of time.

18. The method according to claim 12, wherein said first manner includes consecutive rotation of said recording medium and said second manner includes rotation of said cleaning member only for a predetermined period of time.

19. A recording and/or reproducing apparatus comprising:
(A) magnetic head means for recording signals on a magnetic recording medium which is flexible and/or reproducing signals from the recording medium;
(B) rotating means adapted for rotating said recording medium relative to said head means for signal recordation or reproduction and for rotating a head cleaning member which is flexible relative to the head means for cleaning the head means; and
(C) control means for controlling said rotating means in a first manner for rotating said recording medium relative to said head means to form an air spacing therebetween and for controlling the rotating means in a second manner different from said first manner for rotating the cleaning member relative to the head means so that the head and the cleaning member are substantially in contact with each other.

20. The apparatus according to claim 19, wherein said control means is arranged to operate said rotating means at a first rotational speed in said first manner and to operate the rotating means at a second rotational speed lower than said first rotational speed in said second manner.

21. The apparatus according to claim 20, wherein said control means is further arranged to operate said rotating means in a first rotating direction in said first manner and to operate the rotating means in a second rotating direction opposite to said first direction in said second manner.

22. The apparatus according to claim 21, wherein said control means is further arranged to consecutively operate said rotating means in said first manner and to operate the rotating means only for a predetermined period of time in said second manner.

23. The apparatus according to claim 19, wherein said control means is arranged to operate said rotating means in a first rotating direction in said first manner and to operate the rotating means in a second rotating direction opposite to said first direction in said second manner.

24. The apparatus according to claim 23, wherein said control means is further arranged to consecutively operate said rotating means in said first manner and to operate the rotating means only for a predetermined period of time in said second manner.

25. The apparatus according to claim 19, wherein said control means is arranged to consecutively operate said rotating means in said first manner and to operate the rotating means only for a predetermined period of time in said second manner.

26. The apparatus according to claim 19, wherein said recording medium and said cleaning member are supported by a common flexible support means and wherein said rotating means is arranged to rotate said support means relative to said head means, said apparatus further comprising:

positioning means for positioning said head means relative to said support means to selectively face the head means with the recording medium and with the cleaning member, said control means being responsive to said positioning means and being arranged to control said rotating means in said first manner when said head means is faced with the recording medium and to control the rotating means in said second manner when the head means is faced with the cleaning member.

27. The apparatus according to claim 19, wherein the apparatus is selectively loadable with said recording medium and said cleaning member, and said control means is responsive to the loading of said recording medium and of said cleaning member and is arranged to cause control of said rotating means in said first manner when the apparatus is loaded with the recording medium and to control the rotating means in said second manner when the apparatus is loaded with the cleaning member.

* * * * *